(12) United States Patent
Wu

(10) Patent No.: US 10,840,712 B2
(45) Date of Patent: Nov. 17, 2020

(54) CHARGING DEVICE, CHARGING METHOD AND TERMINAL

(71) Applicant: YULONG COMPUTER TELECOMMUNICATION SCIENTIFIC (SHENZHEN) CO., LTD., Shenzhen (CN)

(72) Inventor: Ju-Zhang Wu, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 101 days.

(21) Appl. No.: 16/080,657

(22) PCT Filed: Mar. 31, 2016

(86) PCT No.: PCT/CN2016/078162
§ 371 (c)(1),
(2) Date: Aug. 28, 2018

(87) PCT Pub. No.: WO2017/147960
PCT Pub. Date: Sep. 8, 2017

(65) Prior Publication Data
US 2019/0103748 A1    Apr. 4, 2019

(30) Foreign Application Priority Data

Feb. 29, 2016 (CN) .......................... 2016 1 0113118

(51) Int. Cl.
*H02J 7/00* (2006.01)
*H02J 7/04* (2006.01)
*H02J 7/02* (2016.01)
*H02J 7/06* (2006.01)

(52) U.S. Cl.
CPC ............ *H02J 7/0019* (2013.01); *H02J 7/007* (2013.01); *H02J 7/0024* (2013.01); *H02J 7/0071* (2020.01); *H02J 7/045* (2013.01); *H02J 7/022* (2013.01); *H02J 7/06* (2013.01); *H02J 2207/10* (2020.01); *Y02B 40/90* (2013.01)

(58) Field of Classification Search
CPC ........ H02J 7/0019; H02J 7/0071; H02J 7/045; H02J 7/0024; H02J 7/007; H02J 2207/10; H02J 7/022; H02J 7/06; H02J 7/008; H02J 7/0086; Y02B 40/90
USPC .................................... 320/118, 109; 701/22
See application file for complete search history.

(56) References Cited

U.S. PATENT DOCUMENTS

| | | | |
|---|---|---|---|
| 2013/0113415 A1* | 5/2013 | Chen ...................... | H02J 7/0068 320/107 |
| 2014/0347003 A1* | 11/2014 | Sporck .................... | H02J 7/022 320/107 |
| 2019/0222047 A1* | 7/2019 | Chen ........................ | H02J 7/00 |

* cited by examiner

*Primary Examiner* — Zixuan Zhou
(74) *Attorney, Agent, or Firm* — ScienBiziP, P.C.

(57) ABSTRACT

A charging device, a charging method and a terminal, an output end of the main charging circuit and output ends of the at least two secondary charging circuits are connected to a battery of an electronic device, and the output end of the main charging circuit is used for supplying power to an internal chip of the electronic device, disconnecting a connection between the main charging circuit and the battery when a voltage of the output end of the main charging circuit reaches a voltage required by the internal chip, and supplying power for the battery through the output ends of the at least two secondary charging circuits. in this way, charging time is shortened and a purpose of fast charging a battery is achieved.

9 Claims, 6 Drawing Sheets

CHARGING DEVICE, CHARGING METHOD AND TERMINAL

FIELD

The present disclosure relates to a technical field of charging, specifically a charging device, a charging method, and a terminal.

BACKGROUND

Number of cores of a central processing unit (CPU) in an electronic device is increasing and screens are getting larger and larger, thus a battery capacity of the electronic device has to be improved for ensuring a certain performance of the electronic device, thus charging time of the battery is increased. In order to shorten the charging time as much as possible and reduce increased charging temperature, manufacturers of the electronic device have conducted research on fast charging of batteries.

Currently, a charging device includes a main charging circuit and a secondary charging circuit. A double-charging channel formed by the two charging circuits is used for charging the battery, charging phases of a current battery include trickle charging, pre-charging, constant current charging, and constant voltage charging. When a charging mode of the double-charging channel is adopted, the charging device switches on the main charging circuit and the secondary charging circuit at the same time in the constant current phase and the constant voltage phase to realize fast charging.

However, a power supply range allowed by a voltage output end in a current charging device is usually not allowed to exceed 4.5V, thus charging time of the charging device during the constant voltage phase is increased, and the charging time is extended.

SUMMARY

Accordingly, the present disclosure provides a charging device, a charging method, and a terminal for shortening charging time to achieve the purpose of fast charging a battery. The technical solutions are as follows:

The disclosure provides a charging device, which includes a charging circuit and a controller. The charging circuit includes a main charging circuit and at least two secondary circuits, and the main charging circuit and the at least two secondary charging circuits are connected in parallel. An input end of the main charging circuit and input ends of the at least two secondary charging circuits are connected to an external power supply device. An output end of the main charging circuit and output ends of the at least two secondary charging circuits are connected to a battery of an electronic device, in which the output end of the main charging circuit is used for supplying power to an internal chip of the electronic device;

The controller, connected to the charging circuit, is used for managing a charging process of the charging circuit. Managing the charging process of the charging circuit includes: disconnecting a connection between the main charging circuit and the battery when a voltage of the output end of the main charging circuit reaches a voltage required by the internal chip, and supplying power for the battery through the output ends of the at least two secondary charging circuits.

Optionally, circuit structures of the main charging circuit and the at least two secondary charging circuits are the same.

Optionally, the input end of the main charging circuit and the input ends of the at least two secondary charging circuits are connected to the external power supply device through a universal serial bus.

The disclosure further provides a charging method, which is applied to a charging device, the charging method includes:

Controlling a main charging circuit in the charging device to switch from charging a battery of an electronic device to supplying power to an internal chip of the electronic device after a charging phase of the charging device enters a constant current phase;

Increasing voltages of output ends of all secondary charging circuits in the charging device, such that increased voltages of the output ends of the secondary charging circuits is greater than a voltage required by the internal chip;

Controlling all of the secondary charging circuits to charge the battery using the increased voltage.

Optionally, controlling a main charging circuit in the charging device to switch from charging a battery of an electronic device to supplying power to an internal chip of the electronic device after a charging phase of the charging device enters a constant current phase, includes:

Controlling the main charging circuit to switch from charging a battery to supplying power to the internal chip of the electronic device when detecting a voltage of the output end of the main charging circuit reaching a voltage required by the internal chip of the electronic device after the charging phase of the charging device enters a constant current phase.

Optionally, upon detection of the voltage of the output end of the main charging circuit reaching the voltage required by the internal chip of the electronic device before controlling the main charging circuit to switch from charging the battery to supplying power to the internal chip of the electronic device, the method further includes: after the charging phase of the charging device enters the constant current phase, turning on the main charging circuit and all of the secondary charging circuits in the charging device to charge the battery.

Optionally, controlling of the main charging circuit in the charging device to switch from charging the battery to supplying power to the internal chip of the electronic device, includes turning off a switching circuit of the main charging circuit to cut off a path between the output end of the main charging circuit and the battery.

Optionally, the method further includes: that upon detection of an input end of the main charging circuit and the input ends of all of the secondary charging circuits are not being connected to an external power supply device, turning on the switch circuit to switch on a path between the output end of the main charging circuit and the battery.

Optionally, the method further includes: under the condition that the charging device is not a fast charging device, turning on the main charging circuit and controlling the main charging circuit to charge the battery using a first charging current.

Optionally, the method further includes: that when the charging device is the fast charging device, and the charging phase of the charging device is not entered the constant current phase, turning on the main charging circuit, and controlling the main charging circuit to charge the battery using a second charging current, in which a value of the second charging current is greater than a value of the first charging current.

The disclosure further provides a terminal, which includes the charging device according to any of the above technical solutions.

BRIEF DESCRIPTION OF THE DRAWINGS

In order to more clearly illustrate technical solutions of embodiments of the present disclosure or exist technology, drawings used in the embodiments or the exist technology description will be briefly introduced below. Obviously, the drawings in following description represent only some embodiments of the present disclosure, for those of ordinary skill in the art, other drawings can be obtained according to the drawings without creativity.

DETAILED DESCRIPTION

Figure 1:
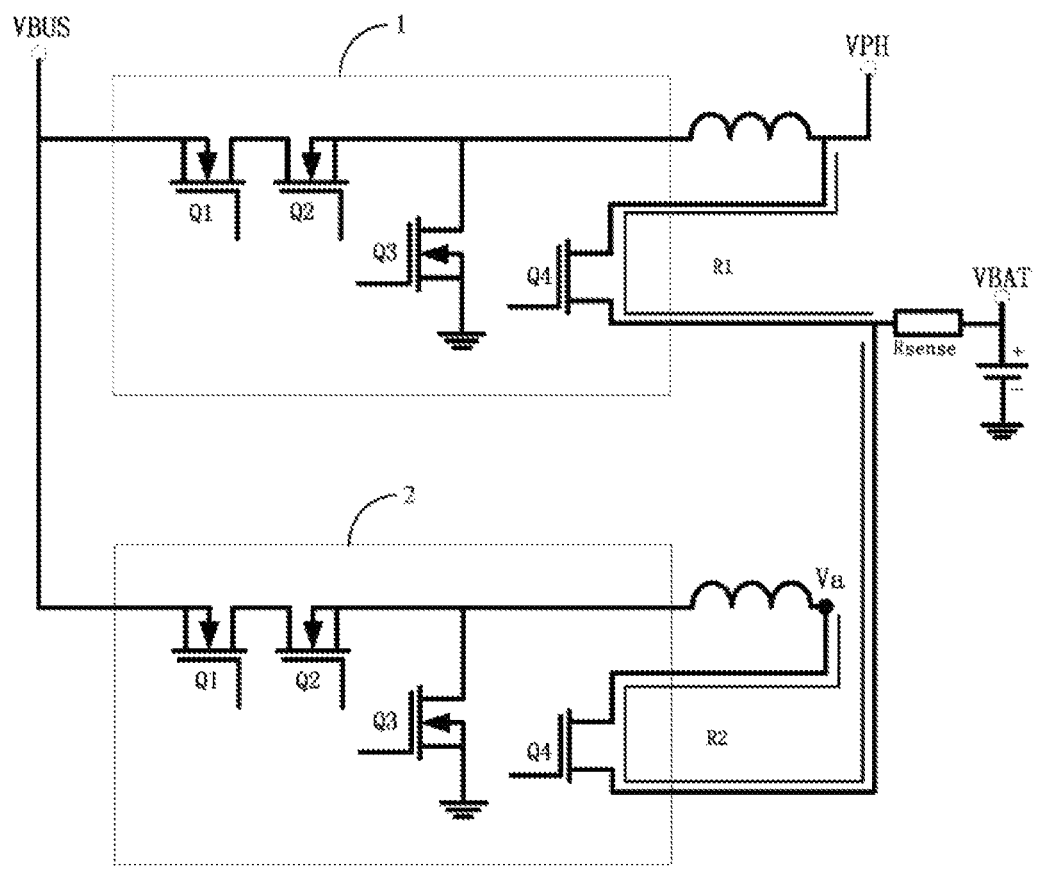
FIG. 1 is a schematic structural diagram of a charging device of prior art.

Through researches, the inventor has found that in four charging phases including trickle charging, pre-charging, constant current charging, and constant voltage charging, a constant current phase is the fastest charging phase, and a constant voltage phase is the slowest charging phase, thus a duration of the constant current phase needs to be extended, and a duration of the constant voltage phase needs to be shortened to achieve a purpose of shortening charging time. For this reason, the inventor analyzes an existing charging device to obtain a technical solution for shortening the charging time, and the inventor performs following analysis using the existing charging device as shown in FIG. 1:

FIG. 1 shows, as prior art, the charging device adopting a charging mode of double-charging channels. The charging mode generally turns on a main charging circuit 1 and a secondary charging circuit 2 to charge a battery in a constant current phase and a constant voltage phase. In the constant current phase, charging current I=VPH/R1+Va/R2, in order to ensure the reasonable charging currents of the two charging circuits, usually VPH≈Va, in which the VPH is an output end of the main charging circuit. The battery is charged through a path of equivalent impedance R1, and the Va is an output end of the secondary charging circuit. A path of equivalent impedance R2 is used for charging the battery. Correspondingly, the VBAT is an output end of the battery, and the VBUS is an input end of the charging device and is used for connecting to an external power supply device. When a VBUS end is not connected to the external power supply device, the battery outputs voltages to the VPH for charging an internal chip in an electronic device. At present, a power supply range of the internal chip is not allowed to exceed 4.5V, thus a maximum voltage of the VPH is limited to be 4.5V. Generally, under an ideal condition of a high-voltage fast charging, in the above FIG. 1, $R_{BATT} \approx 60$ mR, $R1 \approx R2 \approx 20$ mR, Rsense$\approx 10$ mR, in which the $R_{BATT}$ is equal to an internal resistance of a battery protection board plus an internal resistance of the battery and an impedance of a battery connector. It is assumed that a maximum current charged into the battery is 4 A (charge of 2 A per channel of double-channels), an open-loop voltage of the battery from the constant current phase to the constant voltage phase can be calculated as: $VPH_{MAX} - 2 A*R1 - 4 A*(R_{BATT} + Rsense) \approx 4.5V - 2 A*20$ mR$ - 4 A*(60$ mR$+10$ mR$) = 4.18V$. That is to say, in the charging device shown in FIG. 1 as mentioned above, when the open-loop voltage of the battery reaches 4.18V, the charging phase enters the constant voltage phase from the constant current phase.

In conclusion, in order to shorten the duration of the constant voltage phase, the open-loop voltage of the battery, which is transferred from the constant current phase to the constant voltage phase, needs to be raised. There are two implementation methods to achieve the increase in the open-loop voltage of the battery: (1) reducing a charging path impedance (as the R1 and the R2) and (2) raising the $VPH_{MAX}$. For reducing the charging path impedance, a bottleneck has been reached and room for reducing the impedance is not large. It is also affected by power supply load requirement of the charging device (a voltage requirement of the internal chip) for raising the $VPH_{MAX}$, which is not allowed to exceed 4.5V. In order to overcome the above difficulties, embodiments of the present disclosure provides a charging device, a connection between the main charging circuit and the battery being disconnected when the voltage of the output end of the main charging circuit reaches the voltage required by the internal chip, and a power supply for the battery through output ends of the secondary charging circuits. The duration of the constant current phase is thus extended, and the charging time is shortened.

Figure 2:
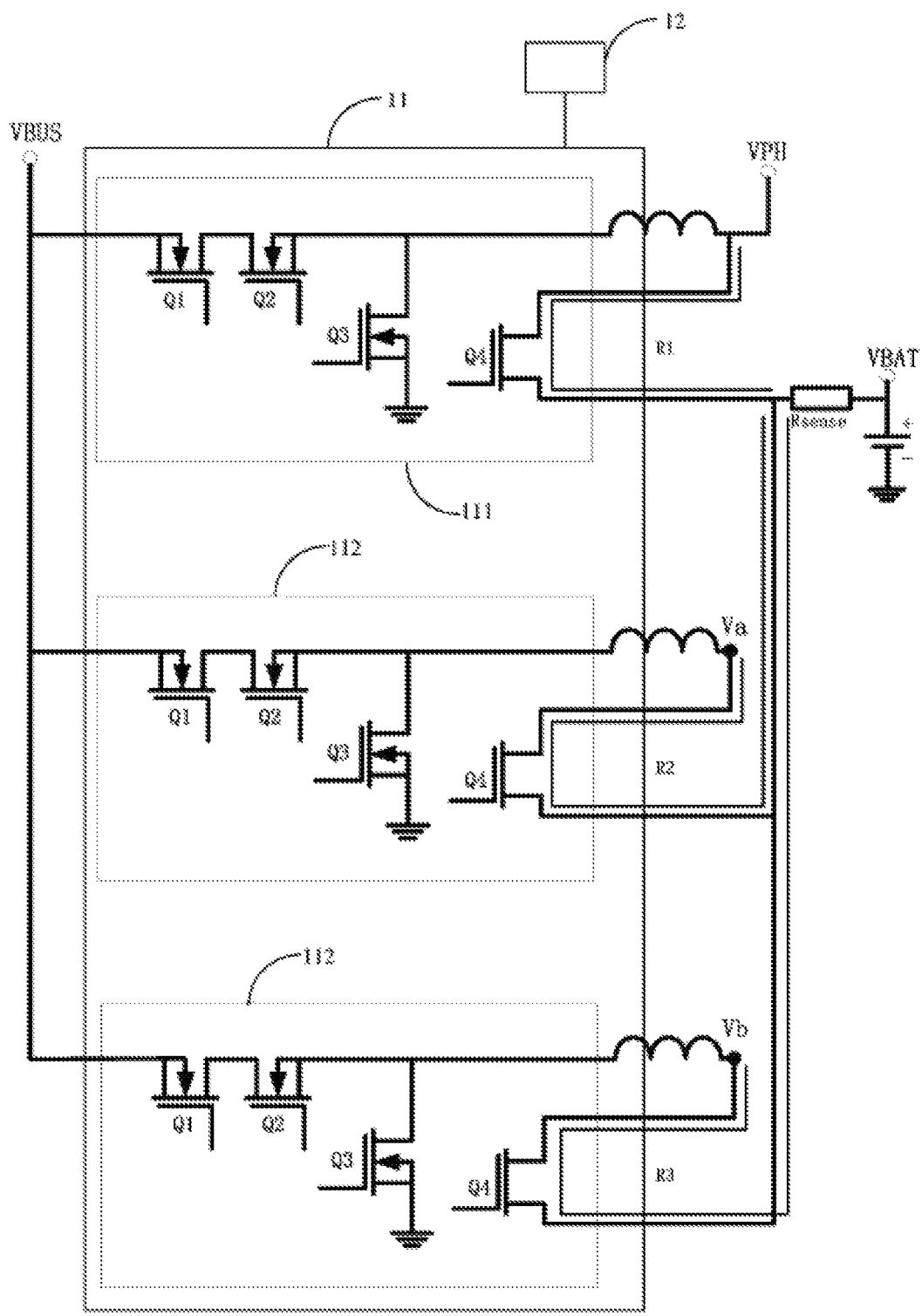
FIG. 2 is a schematic structural diagram of a charging device according to an embodiment of the present disclosure.

As shown in FIG. 2, a structure diagram of the charging device is provided by an embodiment of the present disclosure. The charging device includes: a charging circuit 11 and a controller 12, the charging circuit 11 includes a main charging circuit 111 and at least two secondary circuits 112 (two secondary charging circuits are illustrated in FIG. 2). The main charging circuit 111 and the at least two secondary charging circuits 112 are connected in parallel, an input end of the main charging circuit 111 and input ends of the at least two secondary charging circuits 112 are connected to an external power supply device, thus a voltage of the external power supply device is inputted to the corresponding charging circuits through the input ends to charge a battery of an electronic device.

An output end (such as a VPH in FIG. 2) of the main charging circuit 111 and output ends of the at least two secondary charging circuits 112 (such as a Va and a Vb in FIG. 2) are connected to the battery (such as a VBAT in FIG. 2) of the electronic device, and the output end of the main charging circuit 111 is used for supplying power to the internal chip of the electronic device, that is, the internal chip of the electronic device is powered through the VPH.

The controller 12 is connected to the charging circuit 11, and is used for managing a charging process of the charging circuit. Management of the charging process of the charging circuit includes: disconnecting a connection between the main charging circuit 111 and the battery when a voltage of the output end of the main charging circuit 111 reaches a voltage required by the internal chip, and supplying power for the battery through the output ends of the at least two secondary charging circuits 112.

For example, during charging, when the voltage of the VPH reaches an upper limit value of 4.5V, the controller 12 turns off the Q4 MOFFET of the main charging circuit, thus the connection between the main charging circuit 111 and the battery is disconnected. Even if the VPH is isolated from the VBAT, and that the VPH and the VBAT are not affected by each other, the power supplied by the VPH to the internal chip of the electronic device can be obtained from the external power supply device through the main charging circuit 111. After the VPH and the VBAT are isolated, the controller 12 continues to control the at least two secondary charging circuits 112 to charge the battery. Since the VPH and the VBAT are in an isolated state, an upper voltage limit of the output ends of the two secondary charging circuits is no longer limited by the aforementioned 4.5V, and can be increased to 4.6V or higher (determined by a specific condition). Based on calculating a formula of the open-loop voltage of the battery mentioned above, it can be known that the open-loop voltage of the battery entering the constant voltage phase is raised from 4.18V to 4.28V or higher (determined by the upper voltage limit of the Va and the Vb after increase). According to the charging device provided by the embodiment of the present disclosure, when the voltage of the battery open-loop is raised from 4.18V to 4.28V, provides the charging phase as a constant current phase, compared with the existing technology, while a constant voltage phase is raised from 4.18V to 4.28V. The duration of the constant current phase is thereby extended, the charging time is shortened, and the purpose of fast charging a battery is achieved.

In summary, in the charging device provided by the present disclosure, the output end of the main charging circuit 111 and the output ends of the at least two secondary charging circuits 112 are connected to the battery of the electronic device. The output end of the main charging circuit 111 is further used for supplying power to the internal chip of the electronic device. Thus when the voltage of the output end of the main charging circuit 111 reaches a voltage required by the internal chip, the connection between the main charging circuit 111 and the battery can be disconnected, and power is supplied to the battery through the output ends of the at least two secondary charging circuits 112. Since the connection between the main charging circuit 111 and the battery is disconnected, the voltage of the output ends of the at least two secondary charging circuits 112 is not limited by the voltage required by the internal chip, and the duration of the secondary charging circuit in the constant current phase can be extended by increasing the voltage of the output ends of the at least two secondary charging circuits 112. While the constant current phase is the fastest charging phase in the charging phase, the duration of the constant current phase can be extended by increasing the voltage of the output end of the secondary charging circuit 112 to be greater than the voltage required by the internal chip. In this way, the charging time is shortened and the purpose of fast charging the battery is achieved.

It should be noted that, circuit structures of the main charging circuit 111 and the at least two secondary charging circuits 112 are the same, for example, both of them can adopt the circuit structure in FIG. 2. The main charging circuit 111 and the at least two secondary charging circuits 112 may also adopt different circuit structures, and are not limited in the embodiment of the present disclosure. The input end of the main charging circuit 111 and the input ends of the at least two secondary charging circuits 112 are connected to the external power supply device through a universal serial bus (USB), thus any power supply device with a USB interface can connect to the VBUS to provide a charging source for the charging device.

Figure 3:
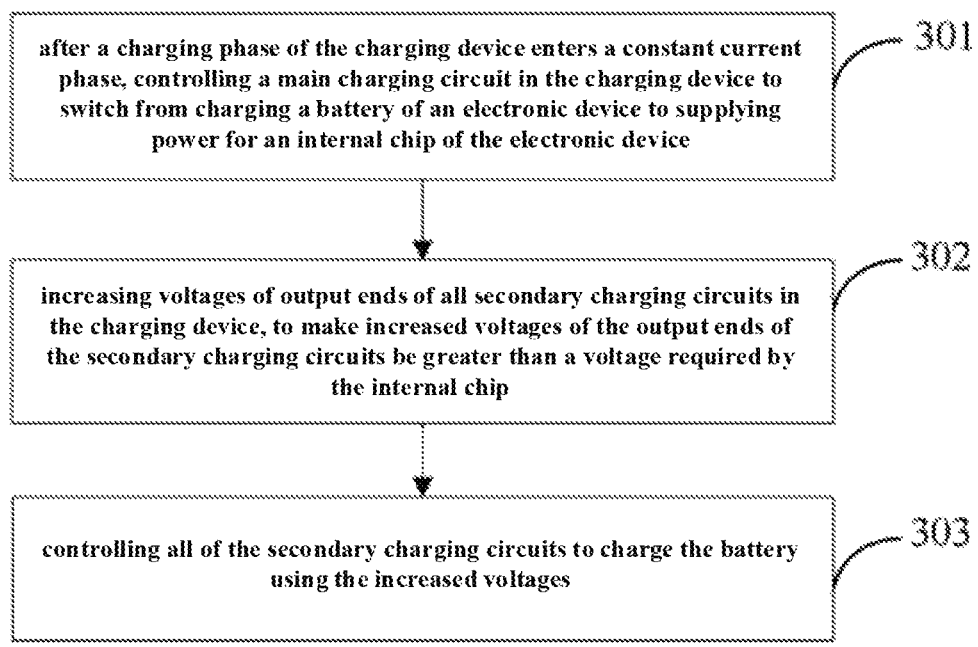
FIG. 3 is a flowchart of a charging method according to an embodiment of the present disclosure.

The embodiment of the disclosure further provides a charging method applied to a charging device. A structure of the charging device can adopt the charging device described in the above device embodiment, the flow of the charging method provided by the embodiment of the present disclosure is as shown in FIG. 3, and may include the following steps:

301: Controlling a main charging circuit in the charging device to switch from charging a battery of an electronic device to supplying power to an internal chip of the electronic device after a charging phase of the charging device enters a constant current phase.

302: Increasing voltages of output ends of all secondary charging circuits in the charging device, such that increased voltages of the output ends of the secondary charging circuits is greater than a voltage required by the internal chip.

303: Controlling all of the secondary charging circuits to charge the battery using the increased voltages.

It can be known from the above flow that, after controlling the main charging circuit to switch from charging the battery of the electronic device to supplying power to the internal chip of the electronic device, a connection between the main charging circuit and the battery is disconnected, thus the voltage of the output of all secondary charging circuits is no longer limited by the voltage required by the internal chip. Therefore, during a process of controlling all of the secondary charging circuits to charge the battery, the voltages of the output end of all the secondary charging circuits can be increased, thus the voltages of the output ends of all secondary charging circuits are greater than the voltage required by the internal chip. Since increasing the voltage at the output will increase a duration of the secondary charging circuit in the constant current phase, and the constant current phase is the fastest charging phase in the charging phase, a duration of the constant current phase can be extended by increasing voltages of output ends of all secondary charging circuits to be greater than the voltage required by the internal chip. In this way, charging time is shortened and a purpose of fast charging the battery is achieved.

In the present disclosure, controlling the main charging circuit in the charging device to switch from charging the battery of the electronic device to supplying power to the internal chip of the electronic device allows for (after the charging phase of the charging device enters the constant current phase), switching the main charging circuit from charging the battery to supplying power to the internal chip of the electronic device directly.

Or, after the charging phase of the charging device enters the constant current phase, it is determined whether the voltage of the output end of the main charging circuit reaches a voltage required by the internal chip of the electronic device, if the voltage of the output end of the main charging circuit is determined to reach the voltage required by the internal chip of the electronic device, the main charging circuit is controlled to switch from charging the battery to supplying power to the internal chip of the electronic device. For example, the charging device determines whether the voltage of the output of the main charging circuit reaches 4.5V, and if the charging device determines the voltage of the output of the main charging circuit reaches 4.5V, controls the main charging circuit to switch from charging the battery to supplying power to the internal chip of the electronic device.

Correspondingly, a specific implementation of controlling the main charging circuit to switch from charging the battery to supplying power to the internal chip of the electronic device can be: turning off a switching circuit of the main charging circuit to cut off a path between the output end of the main charging circuit and the battery. Taking FIG. 2 as an example, Q4, which is in the main charging circuit of FIG. 2, is a switching circuit. After the Q4 is turned off, the path between the output end of the main charging circuit and the battery is cut off, the main charging circuit can supply power to the internal chip through the external power supply device that is connected to the VBUS.

Moreover, when it is detected that the input end of the main charging circuit and the input ends of all of the secondary charging circuits are not connected to the external power supply device, the switch circuit is turned on to switch on the path between the output end of the main charging circuit and the battery, thus the internal chip of the electronic device is charged through the battery. Still taking FIG. 2 as an example, when it is detected that there is no power supply device connected to the VBUS, the Q4 is turned on, and the path between the output end of the main charging circuit and the battery is turned on, and the voltage in the battery is outputted through the internal chip of the electronic device through the path.

Figure 4:
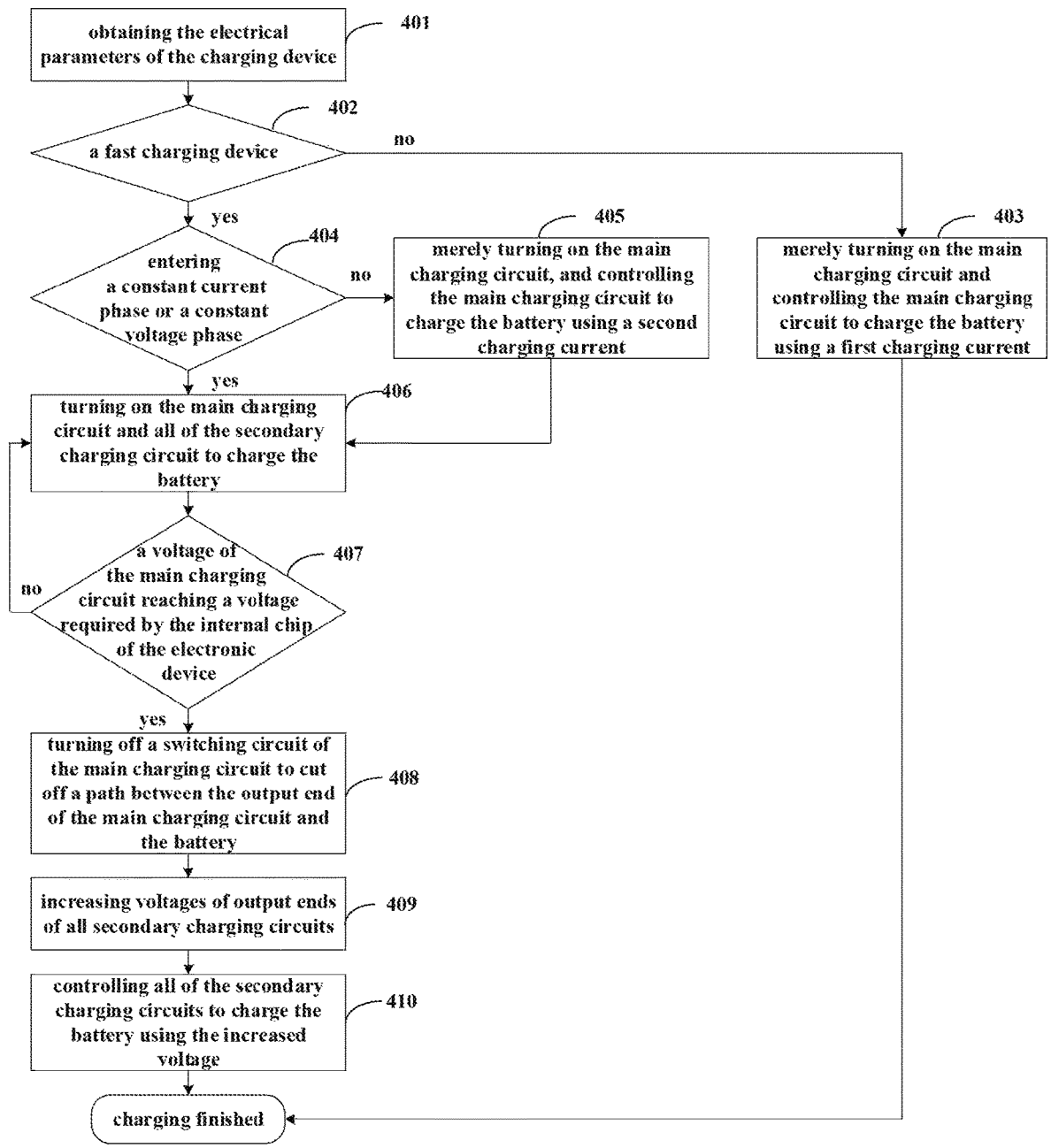
FIG. 4 is another flowchart of a charging method according to an embodiment of the present disclosure.

In addition, in an embodiment of the present disclosure, the charging method provided by the embodiment of the present disclosure will be described through two flowcharts, the flowcharts show the charging process of the charging device before and after the constant current phase. Firstly, referring to FIG. 4, which corresponds to a solution of controlling the main charging circuit to switch from charging the battery to supplying power to the internal chip of the electronic device. This step occurs after the charging phase of the charging device enters a constant current phase and when it is detected that the voltage of the output end of the main charging circuit reaches the voltage required by the internal chip of the electronic device. The solution specifically may include the following steps:

401: Obtaining the electrical parameters of the charging device.

402: Determining whether the charging device is a fast charging device based on the electrical parameters, if it is determined that the charging device is not the fast charging device, executing step 403, if it is determined that the charging device is the fast charging device, executing step 404.

In an embodiment of the present disclosure, a solution of obtaining the electrical parameters and determining whether the charging device is a fast charging device is the same as the solution in the existing technology, and it is not described here.

403: turning on the main charging circuit and controlling the main charging circuit to charge the battery using a first charging current.

404: Determining whether the charging phase of the charging device enters a constant current phase or a constant voltage phase, if it is determined that the charging phase of the charging device enters the constant current phase, executing step 405, if it is determined that the charging phase of the charging device enters the constant voltage phase, executing step 406.

405: turning on the main charging circuit, and controlling the main charging circuit to charge the battery using a second charging current, in which a value of the second charging current is greater than a value of the first charging current, thus the battery is charged fast through the main charging circuit.

406: Turning on the main charging circuit and all of the secondary charging circuit to charge the battery. Since a number of turned on charging circuits is increased after entering the constant current phase, the charging current of the main charging circuit may be decreased from the second charging current. For example, when the main charging circuit is turned on, the second charging current of the main charging circuit is 2 A, when a number of turned on charging circuits is three, and the charging current on each charging circuit is the same, and the charging current flowing through the battery is 4 A, then the charging current on each charging circuit is 4 A/3, the second charging current on the main charging circuit is reduced from 2 A to 4 A/3.

407: Determining whether a voltage of the output end of the main charging circuit reaches a voltage required by the internal chip of the electronic device, if the voltage of the output end of the main charging circuit is not determined to reach the voltage required by the internal chip of the electronic device, returning to execute step 406, that is turning on the main charging circuit and all of the secondary charging circuits to charge the battery; if the voltage of the output end of the main charging circuit is determined to reach the voltage required by the internal chip of the electronic device, then executing step 408.

408: Turning off a switching circuit of the main charging circuit to cut off a path between the output end of the main charging circuit and the battery.

409: Increasing voltages of output ends of all secondary charging circuits such that increased voltages of the output ends of the secondary charging circuits is greater than a voltage required by the internal chip.

410: Controlling all of the secondary charging circuits to charge the battery using the increased voltage, the phase of charging the battery with the increased voltage includes a constant current phase and a constant voltage phase. When an open-loop voltage of the battery does not reach a maximum value that is obtained based on the increased voltage, all of the secondary charging circuits are charged in the constant current phase; when an open-loop voltage of the battery does not reach a maximum value that is obtained based on the increased voltage, all of the secondary charging circuits are charged in the constant voltage phase.

Taking the voltage of all of the secondary charging circuits being increased to 4.6V as an example, when the maximum open-loop voltage of the battery is 4.28V, all of the secondary charging circuits are charged in the constant current phase before the open-loop voltage of the battery reaches 4.28V; when the voltage of the open-loop voltage reaches 4.28V, all of the secondary charging circuits are charged in the constant voltage phase.

Figure 5:
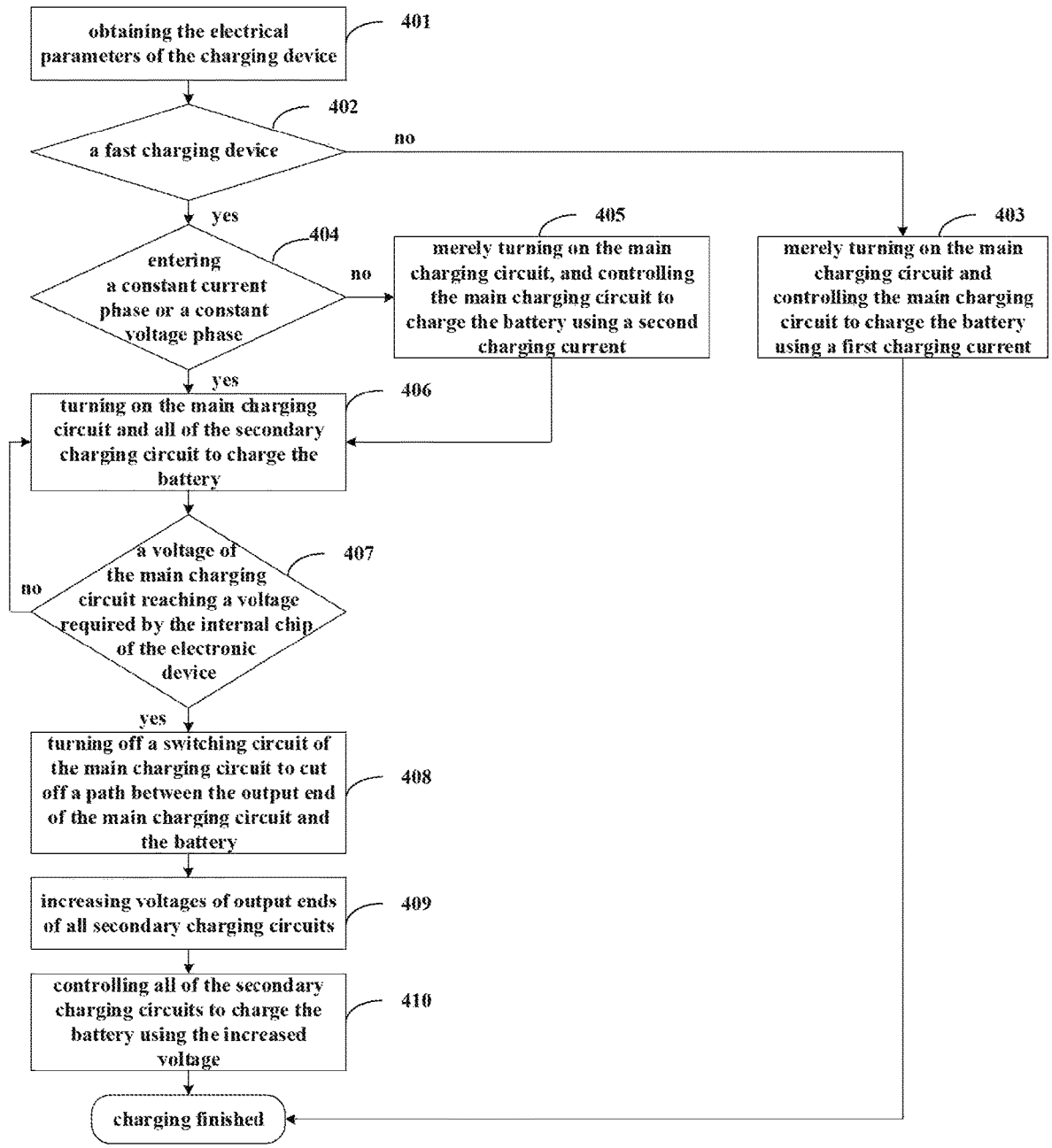
FIG. 5 is another flowchart of a charging method according to an embodiment of the present disclosure.

Secondly, referring to FIG. 5, which corresponds to a solution of switching the main charging circuit from charging the battery to supplying power to an internal chip of the electronic device directly after the charging phase of the charging device enters the constant current phase. The solution specifically may include the following steps:

501: Obtaining the electrical parameters of a charging device.

502: Determining whether the charging device is a fast charging device based on the electrical parameters, if it is determined that the charging device is not the fast charging device, executing step 503, if it is determined that the charging device is the fast charging device, executing step 504.

In an embodiment of the present disclosure, a solution of obtaining the electrical parameters and determining whether the charging device is a fast charging device is the same as the solution in the existing technology, and it is not described here again.

503: turning on the main charging circuit and controlling the main charging circuit to charge the battery using a first charging current.

504: Determining whether the charging phase of the charging device enters a constant current phase or a constant voltage phase, if it is determined that the charging phase of the charging device enters the constant current phase, executing step 505, if it is determined that the charging phase of the charging device enters the constant voltage phase, executing step 506.

505: turning on the main charging circuit, and controlling the main charging circuit to charge the battery using a second charging current, in which a value of the second charging current is greater than a value of the first charging current, thus the battery is charged fast through the main charging circuit.

506: Turning off a switching circuit of the main charging circuit to cut off a path between the output end of the main charging circuit and the battery.

507: Increasing voltages of output ends of all secondary charging circuits such that increased voltages of the output ends of the secondary charging circuits is greater than a voltage required by the internal chip.

508: Controlling all of the secondary charging circuits to charge the battery using the increased voltage, the phase of charging the battery with the increased voltage includes a constant current phase and a constant voltage phase. When an open-loop voltage of the battery does not reach a maximum value that is obtained based on the increased voltage, all of the secondary charging circuits are charged in the constant current phase; when an open-loop voltage of the battery does not reach a maximum value that is obtained based on the increased voltage, all of the secondary charging circuits are charged in the constant voltage phase.

It should be noted that each embodiment is progressive, and each embodiment focuses on differences from other embodiments, the same similar parts between the embodiments can refer to each other.

In above description, relational terms such as a first and a second are used merely to distinguish one entity or operation from another entity or operation, and there is no requirement or implied that there is any such actual relationship or order between these entities or operations. Furthermore, terms of "including", "comprising" or any other variation are intended to encompass non-exclusive inclusions. Thus, a process, method, article, or device that comprises a plurality of elements includes not only elements, but also other elements not specifically listed, or elements that are inherent to such a process, method, article, or device. Without more restriction, an element defined by the phrase "comprising a" does not exclude the presence of the same element in the process, method, item, or device that comprises the element.

Figure 6:
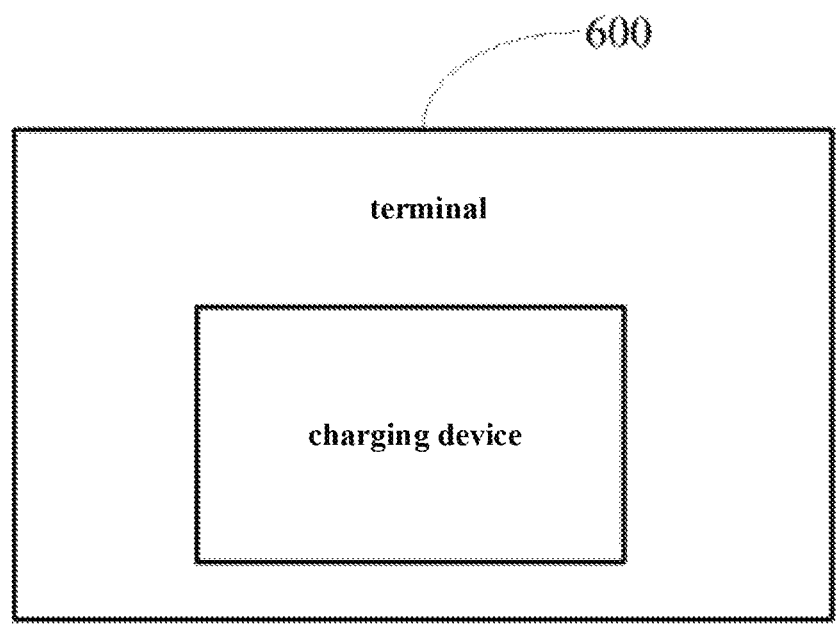
FIG. 6 is a schematic structural diagram of a terminal according to an embodiment of the present disclosure.

As shown in FIG. 6, which shows a terminal in an embodiment of the present disclosure. The present disclosure also provides a terminal 600, which includes the charging device as described above in the technical solution.

The above description of the disclosed embodiments enables those skilled in the art to make or use the disclosure. Various modifications to these embodiments which are obvious to those skilled in the art, and general principles defined here, may be implemented in other embodiments without departing from the spirit or scope of the disclosure. Therefore, the present disclosure is not limited to the embodiments shown here, but is in compliance with the widest range consistent with the principles and novel features disclosed here.

The above are only preferred embodiments of the present disclosure, and it should be noted that several improvements and modifications without departing from the principles of the present disclosure can be made for those skilled in the art, and the improvements and modifications should be considered as within the scope of protection of the present disclosure.

I claim:

1. A charging method, applied to a charging device, comprising: controlling a main charging circuit in the charging device to switch from charging a battery of an electronic device to supplying power to an internal chip of the electronic device after a charging phase of the charging device enters a constant current phase;
increasing voltages of output ends of all secondary charging circuits in the charging device, such that increased voltages of the output ends of the secondary charging circuits be greater than a voltage required by the internal chip;
controlling all of the secondary charging circuits to charge the battery using the increased voltages.

2. The charging method of claim 1, wherein controlling the main charging circuit in the charging device to switch from charging the battery of the electronic device to supplying power to the internal chip of the electronic device after a charging phase of the charging device enters a constant current phase, comprises: controlling the main charging circuit to switch from charging a battery to supplying power to the internal chip of the electronic device when detecting a voltage of the output end of the main charging circuit reaching a voltage required by the internal chip of the electronic device after the charging phase of the charging device enters a constant current phase.

3. The charging method of claim 2, upon detection of the voltage of the output end of the main charging circuit reaching the voltage required by the internal chip of the electronic device before controlling the main charging circuit to switch from charging the battery to supplying power to the internal chip of the electronic device, further comprising: turning on the main charging circuit and all of the secondary charging circuits in the charging device to charge the battery after the charging phase of the charging device enters the constant current phase.

4. The charging method of claim 1, wherein controlling the main charging circuit in the charging device to switch from charging the battery to supplying power to the internal chip of the electronic device, comprises: turning off a switching circuit of the main charging circuit to cut off a path between the output end of the main charging circuit and the battery.

5. The charging method of claim 4, further comprising: upon detection of an input end of the main charging circuit and input ends of all of the secondary charging circuits are not connected to an external power supply device, turning on the switch circuit to switch on the path between the output end of the main charging circuit and the battery.

6. The charging method of claim 1, further comprising: under the condition that the charging device is not a fast charging device, turning on the main charging circuit and controlling the main charging circuit to charge the battery using a first charging current.

7. The charging method of claim 5, further comprising: when the charging device is the fast charging device, and the charging phase of the charging device does not enter the constant current phase, turning on the main charging circuit, and controlling the main charging circuit to charge the battery using a second charging current, a value of the second charging current being greater than a value of the first charging current.

8. The charging method of claim 2, wherein controlling the main charging circuit in the charging device to switch from charging the battery to supplying power to the internal chip of the electronic device, comprises: turning off a switching circuit of the main charging circuit to cut off a path between the output end of the main charging circuit and the battery.

9. The charging method of claim 2, further comprising: under the condition that the charging device is not a fast charging device, turning on the main charging circuit and controlling the main charging circuit to charge the battery using a first charging current.

\* \* \* \* \*